United States Patent [19]

Gomberg et al.

[11] 4,240,852

[45] Dec. 23, 1980

[54] METHOD OF BONDING URETHANE FORMULATIONS TO RUBBER

[75] Inventors: Edward N. Gomberg, Hixon, Tenn.; Dana W. Somesla, Riverside, Calif.

[73] Assignee: Synair Corporation, Chattanooga, Tenn.

[21] Appl. No.: 122,939

[22] Filed: Feb. 19, 1980

Related U.S. Application Data

[63] Continuation-in-part of Ser. No. 969,632, Dec. 14, 1978, abandoned.

[51] Int. Cl.³ .............................................. B29H 17/36
[52] U.S. Cl. ...................................... 156/96; 156/125; 156/315; 264/135; 427/412.3; 428/522; 428/423.9; 428/424.8
[58] Field of Search ................ 156/95, 96, 97, 110 R, 156/110 A, 116, 125, 128 R, 128 P, 242, 314, 315; 428/425, 522; 526/298; 427/407 R, 407 E; 264/36, 326, 134, 135

[56] References Cited

U.S. PATENT DOCUMENTS

| | | | |
|---|---|---|---|
| 2,794,788 | 6/1957 | Coover et al. | 156/331 X |
| 2,873,790 | 2/1959 | Cadwell et al. | 156/125 |
| 3,462,328 | 8/1969 | Buckland | 156/128 P |
| 3,752,694 | 8/1973 | Sayigh et al. | 428/425 |
| 3,936,576 | 2/1976 | Kay | 428/424 |
| 3,975,457 | 8/1976 | Chang | 260/859 R |
| 3,979,547 | 9/1976 | Roberts et al. | 428/423 |
| 4,177,233 | 12/1979 | Roberts | 264/134 |

*Primary Examiner*—John E. Kittle
*Attorney, Agent, or Firm*—Richard W. Keefe; W. Norman Roth; David G. Parkhurst

[57] ABSTRACT

A method wherein uncured urethane formulations are bonded to a cured rubber or synthetic rubber substrate in such a manner so as to provide greater bonding strength than has been achieved previously in urethane formulation bonding to rubber or synthetic rubber.

5 Claims, No Drawings

METHOD OF BONDING URETHANE FORMULATIONS TO RUBBER

The present application is a continuation-in-part of our Ser. No. 969,632 filed Dec. 14, 1978 entitled METHOD OF BONDING URETHANE FORMULATIONS OF RUBBER, now abandoned.

The present invention relates to a method of bonding uncured urethane formulations to substrates and particularly to rubber or synthetic rubber substrates.

BACKGROUND OF THE INVENTION

The desirability of achieving maximum bonding strength between urethane formulations and cured rubber or synthetic rubber substrates has long been known in the art. The bonding of urethane formulations to cured rubber or synthetic rubber substrates has been one of the more difficult problems experienced in the rubber industry and also with users of rubber products. The conventional use of adhesives, primers, bonding agents, etc., available commercially has been unable to provide a urethane-to-rubber bond that is equal in pull strength to a rubber-to rubber bond.

Laboratory adhesion tests using conventional methods of applying primers or adhesive agents, such as cyanoacrylates, allowing them to dry and then applying a urethane formulation as a liquid or a paste and allowing it to cure, normally produces a bond strength ranging from 1 to 30 pli (pounds per linear inch). A desirable bond strength should be at least 80 pli.

SUMMARY OF THE INVENTION

We have found in the present invention that if the uncured urethane is immediately applied to a rubber or synthetic rubber surface wetted with adhesive before the adhesive dried, the bond between the urethane, after curing, and the rubber or synthetic rubber surface is increased three to four times over the maximum bond strength achieved in prior methods where the adhesive was permitted to dry prior to applicaton of the urethane onto the surface.

The invention of the present application has many uses such as repairing tears or worn spots in rubber-based articles subject to considerable wear. For example, the method of the present invention could be used effectively in repairing conveyor belts of a rubber or synthetic rubber material, patching tires which have been torn or ripped, and recapping of tires.

As will be appreciated by a person skilled in the art, there is a great economic need for a method which will permit the user to take advantage of the higher abrasion resistance of cured urethane and the cold-cure characteristics of many urethane formulations which will result in substantial energy and cost savings. The ability of the user to build on a rubber or synthetic rubber substrate with a cold-curing system that has good adhesion offers a wide range of cost-saving industrial applications.

The present invention provides a method of bonding uncured urethane formulations to a cured rubber substrate comprising the steps of:

(a) cleaning the substrate surface;

(b) coating the cleaned substrate surface with a liquid cyanoacrylate adhesive;

(c) coating the substrate surface, wetted with the cyanoacrylate adhesive, with a liquid or paste urethane formulation while the adhesive is still wet and;

(d) permitting the urethane formulations to cure.

The uncured urethane is applied in liquid or paste form until the surface is built up to the desired form or thickness. The urethane is then allowed to cure and after curing has been completed, the repaired surface can be buffed or shaped as desired and can then be used with the repaired area containing the urethane providing greater abrasion resistance than natural rubber or synthetic rubber base material.

Following the procedure outlined above, it is possible to obtain bond strengths in excess of 80 pli.

A particular use of the invention believed to have great commercial significance, is the use of the invention in recapping tires. In conventional practice in recapping tires, a tire is buffed to remove the worn tread and an adhesive is applied to the buffed area. When the adhesive is no longer wet, an uncured rubber is applied over the adhesive. The tire with the rubber thereon is then placed in a steel mold where, with the application of heat, the rubber is cured and in the process the rubber is bonded to the tire. The conventional recapping process requires the consumption of considerable energy and creates air pollution.

The adhesive used in the practice of our invention is one which will adhere to both urethane and cured rubber at room temperature. Cyanoacrylate adhesives satisfy such a requirement; and are available in methyl and ethyl forms. Ethyl cyanoacrylate adhesives are found to be superior in bonding rubbers and elastomers and the generic ingredient of our preferred adhesive is the ethyl α cyanoacrylate ester. Several commerical forms of such an adhesive are available from Loctite Corporation in high, medium and low viscosities. We have found that a medium viscosity of from 100 to 120 CP Brookfield at 78° F. is preferable to prevent excessive penetration of the adhesive into the rubber substrate and to provide adequate "working time" to apply the urethane coating while the adhesive is still wet.

Formulations of the urethane materials which can be used in the practice of our invention can be readily produced by persons skilled in the art from known chemistry techniques in the production of urethanes. The invention can be practiced with a wide variety of elastomers formulated to possess properties desired for the ultimate use of the product. We have found the following two component formulation of urethane material suitable in the various applications of our invention.

| Part A PRODUCT | SOURCE | PERCENT BY WEIGHT |
|---|---|---|
| Pluracol 581 | BASF Wyandotte | 68.3 |
| Isonol 93 | Upjohn Co. | 0.4 |
| methylene dianaline | Allied Chemical | 0.9 |
| micro talc | Abbott Co. | 26.0 |
| Molecular Sieve | Linde | 2.0 |
| mercury proprianate | Merck & Co. | 1.0 |
| black paste | | 1.4 |
| | | 100.0 |
| Part B PRODUCT | SOURCE | PERCENT BY WEIGHT |
| toluene diisocyanate | BASF Wyandotte | 10.48 |
| Pluracol 581 | BASF Wyandotte | 89.52 |
| | | 100.00 |

Part A and Part B are mixed in equal parts by weight prior to intended use until the mixing is complete.

Part A includes talc which is used as a filler in the urethane material for economic reasons. Various other anhydrous fillers can be used, alone or in combination, as is known to formulators skilled in the art, to introduce properties of hardness, abrasion, resistance, tear strength and pigmentation into the urethane material. Such other anhydrous fillers include, for example, hydrated aluminum oxides, calcium carbonate, diatomaceous earth, silica smoke, carbon black, fiberglass, titanium oxide, zinc oxides and bentonite. Of course, the urethane need not include a filler, depending on the conditions of use of the urethane.

The above example of urethane material that can be used in the practice of our invention can be pumped and/or sprayed through a nozzle, spreads with good wetting power, and will gel slowly (about 5 to 30 minutes) without releasing excessive amounts of heat, by remaining below 200° F.

In the practice of the present invention in recapping of tires, the tire is buffed and all buffed material removed from the tire. The clean tire is then wetted with the cyanoacrylate adhesive, and before the adhesive has dried, a coating of uncured urethane liquid or paste is immediately applied to the wetted surface. Before the urethane has an opportunity to completely cure, the tire with the urethane liquid or paste thereon is placed into a mold and additional uncured urethane is pumped into the mold cavity so as to complete the process of building up the desired thickness of tread material on the outer surface of the tire. The urethane is then allowed to cure and with fast curing urethane formulations, the tire can be removed from the mold in about 15 minutes. This time of mold removal can be varied depending upon the cure rate of the particular urethane formulation used. It is preferred that the exothermic reaction of the curing urethane be mild to enable a greater variety of materials to be used in making the mold. Also, with the present invention pressurezation of the urethane in the mold is no longer required, thus permitting a greater variety of materials, such as plastics, to be used in making molds rather than the more expensive conventional metal molds.

A preferred technique would be to mount the buffed and cleaned tire on a mandrel so that it can rotate in a vertical plane. While rotating, the adhesive is sprayed upon the tire and as the tire continues to rotate, the uncured liquid or paste-like urethane material is applied to the adhesive-wetted surface of the tire. The time element is critical so as to insure the application of the urethane to the surface while the adhesive is still wet. The time element can be controlled either by moving a urethane discharging nozzle closer to the point where an adhesive nozzle sprays the adhesive on the tire or just rotating the tire faster. These are all techniques which can be practiced by a person skilled in the art so long as they utilize the inventive concept of applying the initial liquid or paste-like uncured urethane to the tire while the adhesive is still wet.

Preferably, the mold which could be formed of a plastic material, would hold the tire casing in a vertical position and one or more inlets to the interior of the mold would enable additional uncured urethane material to be pumped into the mold cavity until it is completely filled with uncured urethane. Air vents would be provided in the mold so that as the uncured urethane enters the interior of the mold, entrapped air is forced out of the vents.

In conventional recapping, mold time varies with the size of the tire being capped. As tire size and tread thickness increase, demold time increases. The reverse is true for urethane-capped tires. The larger the urethane mass, the faster it will react. Thus, small and large tires could take approximately the same demold time.

Because urethane has significantly better abrasion resistance than rubber, it would be possible to recap a tire casing with a thinner layer of urethane and still obtain the same length of service as would be obtained from a recapped tire having a much thicker layer of rubber material. It is estimated that with the practice of the invention as described and applied to automotive tires recapped with urethane material, it would be possible to obtain from 80,000 to 100,000 miles of service compared with from 25,000 to 40,000 miles for rubber tires.

In the foregoing description and in the claims, the use of the terms "rubber" and "synthetic rubber" are not intended to cover silicone rubber.

We claim:

1. A method of bonding uncured urethane formulation to a cured rubber substrate comprising the steps of:
    (a) cleaning the substrate surface;
    (b) coating the cleaned substrate surface with a liquid cyanoacrylate adhesive;
    (c) coating the substrate surface, wetted with the cyanoacrylate adhesive, with a liquid or paste urethane formulation while the adhesive is still wet; and
    (d) permitting the urethane formulation to cure.

2. The method of claim 1, wherein the urethane formulation is applied to the substrate surface wetted with the cyanoacrylate adhesive in an initial coating and additional amounts of urethane are applied before the initial coating of urethane has cured until the desired volume of urethane is present.

3. The method of claim 2, wherein said volume of urethane is molded into final form.

4. The method of claim 2, wherein said volume of urethane is buffed into final form.

5. A method of recapping a rubber tire with a urethane formulation, comprising the steps of:
    (a) buffing down the tire casing surface to remove old tread and cleaning said surface of extraneous materials;
    (b) coating the buffed tire casing surface with a liquid cyanoacrylate adhesive to wet said surface with adhesive;
    (c) applying an initial liquid or paste coating of an uncured urethane formulation onto said surface while said surface is still wet with the cyanoacrylate adhesive;
    (d) placing said tire in a mold having an interior configuration of the desired shape of the recapped portion of the tire;
    (e) injecting additional liquid or paste urethane formulation into said mold before the initial urethane has cured and filling the interior cavity of the mold;
    (f) removing the recapped tire from the mold as soon as the urethane formulation has set; and
    (g) allowing said urethane formulation to cure.

* * * * *